(Model.)

J. B. MARQUIS.

DEVICE FOR MEASURING THE THICKNESS OF CREAM.

No. 269,804. Patented Dec. 26, 1882.

UNITED STATES PATENT OFFICE.

JAMES B. MARQUIS, OF NORWICH, NEW YORK.

DEVICE FOR MEASURING THE THICKNESS OF CREAM.

SPECIFICATION forming part of Letters Patent No. 269,804, dated December 26, 1882.

Application filed March 4, 1882. (Model.)

*To all whom it may concern:*

Be it known that I, JAMES B. MARQUIS, of Norwich, in the county of Chenango, and in the State of New York, have invented certain new and useful Improvements in Dairy Apparatus; and I do hereby declare that the following is a full, clear, and exact description thereof, reference being had to the accompanying drawings, making a part of this specification, in which—

Figure 1:
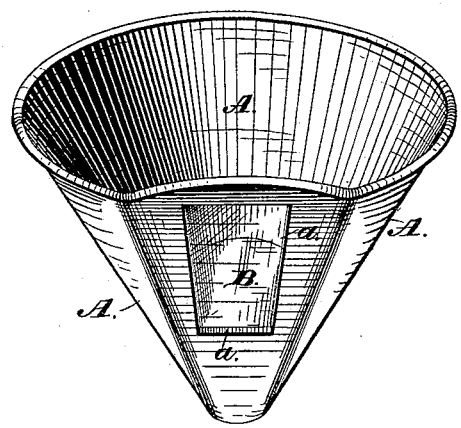
Figure 2:
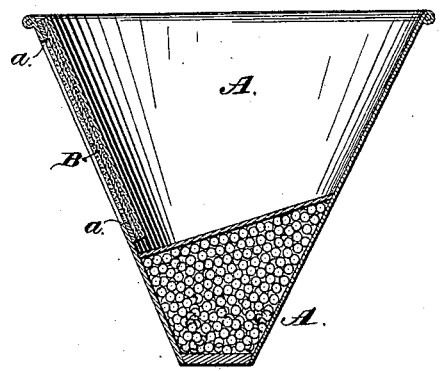

Figure 1 is a perspective view of my improved device, and Fig. 2 is a vertical central section of the same.

Letters of like name and kind refer to like parts in each of the figures.

The object of my invention is to enable the thickness of cream upon milk to be accurately measured; and to this end it consists in a vessel adapted to float partially submerged in an upright position within milk, and provided at or within one of its sides with an opening that is inclosed by means of a glass, through which may be observed the thickness of cream resting upon said milk, substantially as and for the purpose hereinafter specified.

In the annexed drawings, A represents a vessel having preferably upward and outward flaring sides, and having a depth somewhat greater than the greatest thickness of cream that is likely to arise from the milk contained within an ordinary dairy-vat. The proportion and dimensions of the vessel A cause the same to float in an upright position when placed in milk, and, being suitably weighted at its lower end, its upper end will remain slightly above the surface of the milk.

Within one side of the vessel A is an opening, a, that is inclosed by means of a sheet of glass, B, and upon said glass is cut or otherwise affixed a scale of measurement, preferably inches and fractions of the same. The device is now complete, and is used by being placed within the milk of a vat, and when at rest observing through the glass B the upper and lower limits of the stratum of cream, the exact thickness of which latter will be shown by the scale, such measurement enabling skimming apparatus to be readily and quickly adjusted, so as to remove the cream without disturbance of the milk.

Having thus fully set forth the nature and merits of my invention, what I claim as new is—

A vessel adapted to float partially submerged in an upright position within milk, and provided at or within one of its sides with an opening that is inclosed by means of a glass, through which may be observed the thickness of cream resting upon said milk, substantially as and for the purpose specified.

In testimony that I claim the foregoing I have hereunto set my hand this 6th day of January, 1882.

JAMES B. MARQUIS.

Witnesses:
W. F. JENKS,
F. W. ROGERS.